Sept. 13, 1949.　　　　D. C. HARVEY　　　　2,481,661
SELF-ERECTING FRONT CAMERA
Filed Jan. 5, 1946　　　　　　　　　　　　2 Sheets-Sheet 1
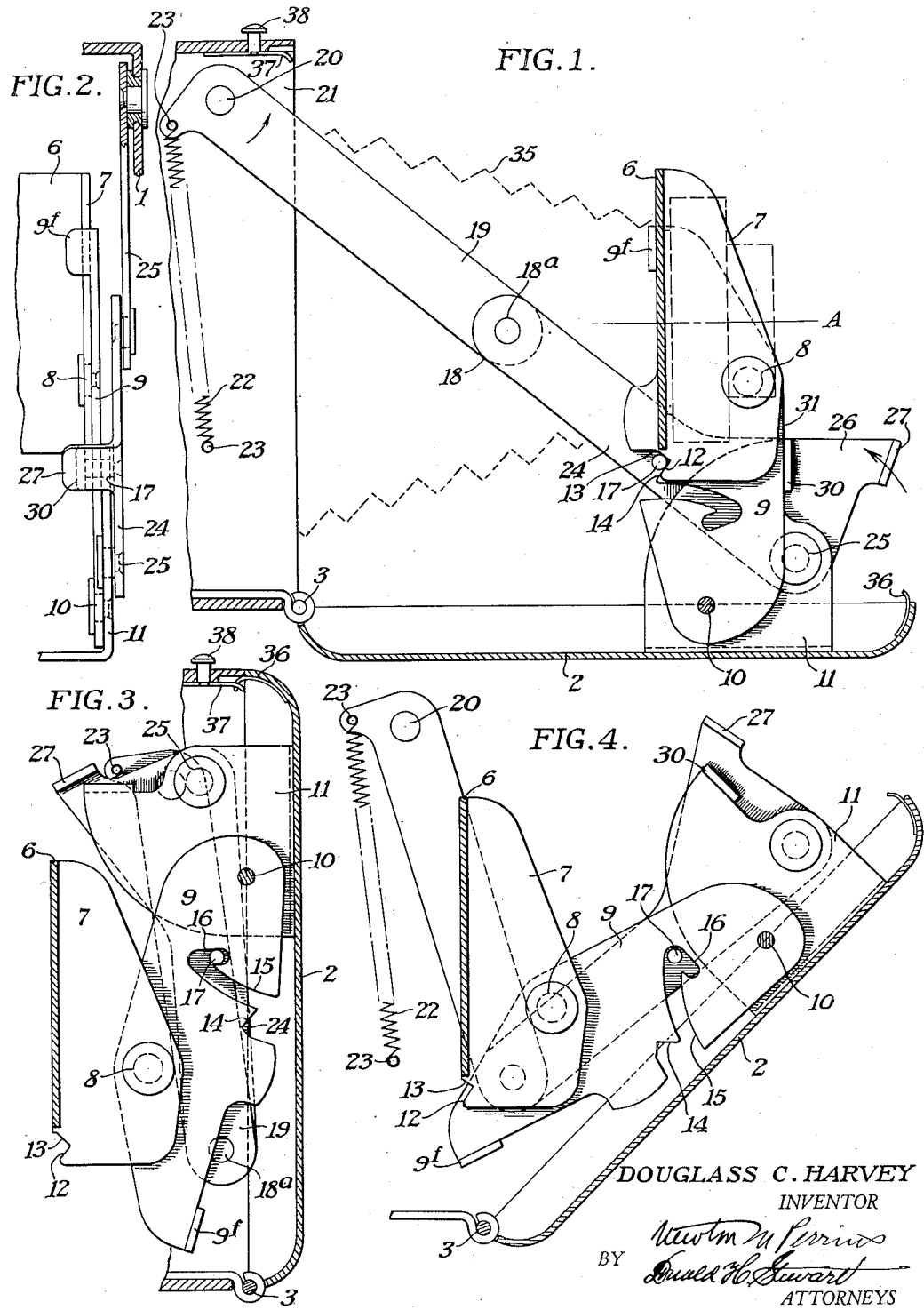

Sept. 13, 1949.　　　　D. C. HARVEY　　　　2,481,661
SELF-ERECTING FRONT CAMERA

Filed Jan. 5, 1946　　　　　　　　　　　　2 Sheets-Sheet 2

DOUGLASS C. HARVEY
INVENTOR

BY
ATTORNEYS

Patented Sept. 13, 1949

2,481,661

UNITED STATES PATENT OFFICE 2,481,661

SELF-ERECTING FRONT CAMERA

Douglass C. Harvey, Rochester, N. Y., assignor to Eastman Kodak Company, Rochester, N. Y., a corporation of New Jersey Application January 5, 1946, Serial No. 639,302

5 Claims. (Cl. 95—40)

This invention relates to photography and more particularly to folding cameras of the self-erecting type. One object of my invention is to provide a camera of the type described in which the camera front will open automatically and will be projected into a picture-taking position. Another object of my invention is to provide a camera in which the parts are designed to hold a lens and shutter rigidly and accurately on the axis of the exposure frame. Another object of my invention is to provide a camera which consists of comparatively few parts so made that the assembling operations are comparatively simple and so made that the desired rigidity is obtained. A still further object of my invention is to provide a simple form of releasing mechanism by which the parts may be released for folding after pictures have been made. Still another object of my invention is to provide a self-erecting front camera for a lens holding mechanism which will resist a thrust toward the camera body at all times except after releasing mechanism has been operated. Other objects will appear from the following specification, the novel features being particularly pointed out in the claims at the end thereof.

Coming now to the drawings in which like reference characters denote like parts throughout:

Fig. 1 is a section through a typical camera having a self-erecting front mechanism constructed in accordance with and embodying a preferred form of my invention. Certain parts have been omitted for clearness.

Fig. 2 is a fragmentary front elevation parts being shown in section of a position of the self-erecting front mechanism shown in Fig. 1.

Fig. 3 is a fragmentary sectional view showing positions of the self-erecting front mechanism in a folded or closed position.

Fig. 4 is a view similar to Fig. 3 but with the parts in the position they assume while the camera is being opened. This view shows the parts with the camera bed lowered about 45° from a closed position.

My invention broadly comprises a camera in which a camera bed may be held in an open position by jointed bed braces, one section of these bed braces operating erecting links which move a camera objective and shutter into a picture-taking position and which lock these parts in a picture-taking position when the bed opens. The camera bed opening movement may be done manually or a spring may furnish the sole power to open the camera when a camera latch is released.

Figure 5:
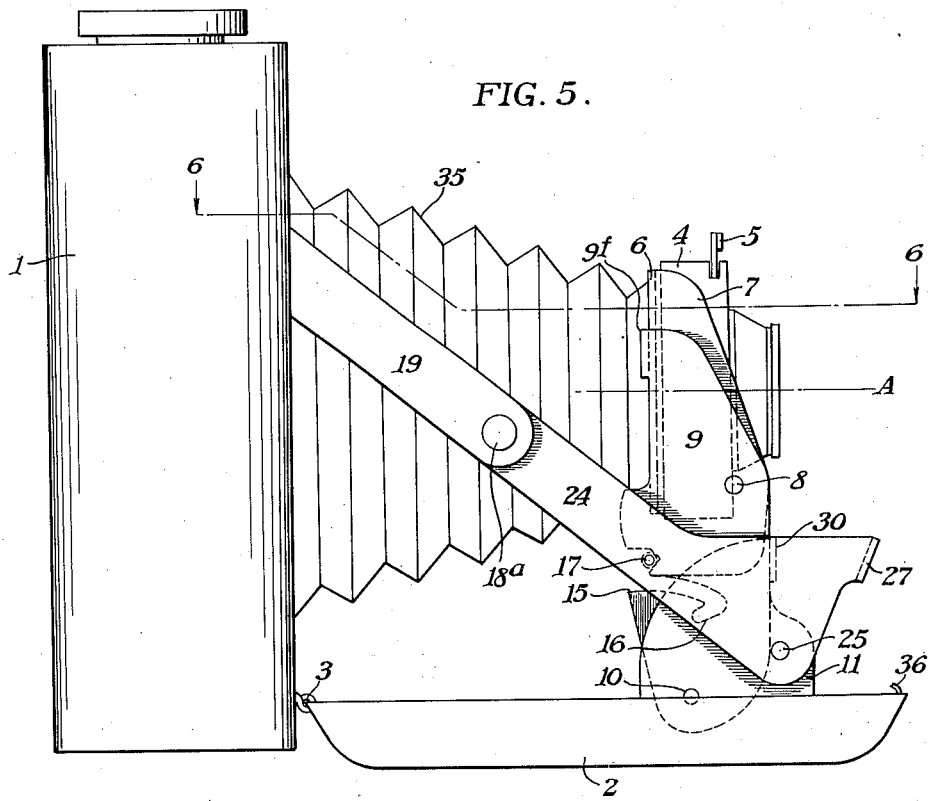
Fig. 5 is a side elevation of a preferred embodiment of my invention when the camera is in an open or picture-taking position.
Figure 6:
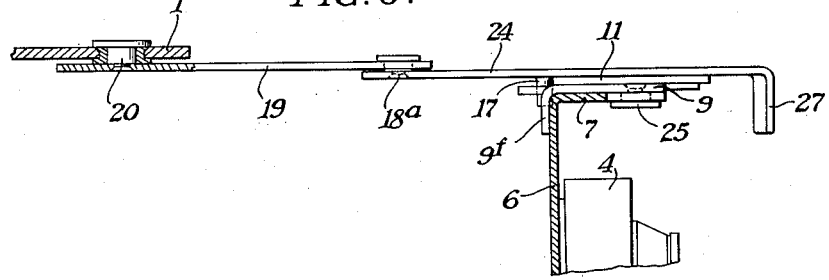
Fig. 6 is a fragmentary detail taken on line 6—6 of Fig. 5 and showing partially in section and partially in elevation a position of the self-erecting front mechanism.

More specifically as shown in Fig. 5 the camera may consist of a camera body 1 to which a bed 2 is attached by means of a hinge 3. The camera body 1 may be of the usual type to support roll film, cut film, plates, or the like in a plane and on an axis A behind an objective, not shown, which may be carried by a between-the-lens type of shutter 4 having the usual trigger 5.

The shutter 4 is carried by a lens board 6, the two edges of which are bent outwardly at 7 to form flanges by which the lens board may be supported. As indicated in Fig. 1 the flanges 7 may be pivotally attached, by means of studs 8, to erecting links 9. These erecting links are attached by pivots 10 to brackets 11 carried by the camera bed 2.

The flanges 7 are provided with cam surfaces 12 terminating in shoulders 13 which are for latching the lens board 6 in an erect position when the camera bed 2 has been swung to its picture-taking position shown in Fig. 1.

The erecting links 9 are each provided with inwardly turned flanges 9f adapted to engage the rear surface of the lens board 6 when in an open position as shown in Fig. 1. In addition, the erecting links 9 are provided with a cam surface 14 leading to a slot having a cam 15 on one side, which terminates in an offset slot 16. The purpose of this slot is to guide the movement of the erecting links 9 when the camera bed is moving between an open and a closed position through the engagement of a pair of pins 17 with the cam slot 15 and the cam slot 16 and to hold the erecting links erect when these pins 17 engage the latching surfaces.

The pins 17 are carried by the jointed bed braces designated broadly as 18. One of these braces is provided on each side of the camera bed. Each bed brace consists of an upper arm 19 pivoted at 20 to an inside wall 21 of the camera body. A spring 22 attached to the offset 23 on the brace and attached to a pin 23 on the camera wall 21 tends to turn the upper arm 19 in a counterclockwise direction as shown by the arrow in Fig. 1. Each brace also includes a lower arm 24 hinged to the upper arm 19 by stud 18a. Each lower arm 24 is also attached to the bracket 11 by means of a stud 25 and there is on each lower arm an extension 26 forwardly and upwardly from the pivots 25, this extension terminating in a finger grip 27. Thus by pushing both finger grips 27 in the direction shown by the arrow in Fig. 1 the jointed braces will turn about the pivots 25 as the camera bed 2 is moved.

When in an open or erect position as shown in Figs. 1 and 5 the pins 17 engage both the shoulders 13 on the flanges 7 of the lens board and in addition the pins engage the cam surfaces 14 of the two erecting links. Since the cam surfaces 14 are circumferentially arranged with respect to the pivots 25, any rearwardly thrust along the camera axis A will be resisted and the parts will be retained in their erect position quite rigidly. The rigidity of the lens board 6 is obtained through the flanges 9f of the erecting links engaging the lens board 6 near the top of the lens board, through the pins 17 engaging the cam surface 12 near the bottom of the lens board and through the studs 8 which pivotally support the flanges 7 at a point spaced from the cam surfaces 12 and the pins 17. There is thus arranged a triangular support for the lens board. Cam surfaces 12 and cams 15 are preferably both arcs drawn circumferentially of studs 25.

Since each jointed bed brace 18 is pivotally attached at 20 to the camera body 21 and is pivotally attached at 25 to the brackets 11, these pivots, together with the hinge pintle 3 form a triangular support for the camera bed 2. Thus as long as the joint braces 18 have the pivotal points 20 and 25 substantially in alignment with the pivot 18a joining the upper and lower arms 19 and 24, the camera bed will be held rigidly in an open position. The brackets 11 are provided with inwardly turned flanges 30 which are positioned to engage the front walls 31 of the erecting links 9. When the parts are in an open position the links 9 have a triangular support due to the lugs 30, the studs 10, and the pins 17. The springs 22 normally thrust the pins 17 into their latching position.

With the parts in the position shown in Fig. 1, in order to close the camera, the finger grips 27 may be pressed inwardly and in the direction shown by the arrow in this figure. This pressure causes the lower arms to move about their pivotal points 25 and likewise causes the upper arms 19 to move about their pivotal points 20 thereby causing the pins 17 to move downwardly over the cam surfaces 12 on the lens board and the cam surfaces 14 on the erecting links. When the pins 17 strike the edge of the guiding slots 15, the erecting links may fall as the pins pass up through the slots 15. The position of the parts when partially closed is shown in Fig. 4. Further closing movement causes the pins 17 to pass into the offset slots 16 and the parts when closed will take the position shown in Fig. 3. During this movement the lens board 6 may swing slightly about its pivotal points 8 and erecting links 9 but the lens and shutter will remain in a generally parallel position with respect to its open position due at least in part to a camera bellows 35 only partially shown in Fig. 1. This is the well-known bellows connected to the lens board 6 and connected around the edge of the exposure frame in the camera body.

When the camera bed 2 has been completely closed as in Fig. 3 it may be held by a suitable latch element 37 on the camera body. This latch element being operatable by a finger grip 38 in a known manner.

With the camera parts constructed as above described it is an extremely simple matter to open the camera by depressing the finger grip 38. This releases latch element 37 from latch element 36 so that the springs 22 may project the jointed bed braces 18 about their respective pivots causing the camera bed to spring open. During this opening movement, the pins 17 carried by the lower arms 24 ride through the offset slots 16 and the cam slots 15 and this movement guides the movement of the erecting arms 9. Just before the final movement of the joint arms 18 takes place, pins 17 move behind the cam surfaces 14 on the erecting links and the cam surfaces 12 on the lens board thrusting the lens board forwardly as the pins reach the shoulders 13. The flanges 12 of the erecting links have then engaged their ends with the upper portions of the lens board thrusting it forward and the erecting links themselves have been brought into contact with the lugs 30 of the brackets 11. Thus the camera is moved in a picture-taking position by a single movement and when once erected, the parts resist closing until the jointed braces 18 are moved so that the three pivotal points no longer lie in a straight line and so that the joint bed braces 18 start to fold. Shoulders 13 may serve as stops or may be omitted.

Since each moving part is so arranged as to have a "3-point suspension" in its erect position, the parts are held very substantially in their picture-taking position from which position they can only be moved by moving the joint bed braces 18:

I claim:

1. In a self-erecting front camera of the type including a camera body, a camera bed hingedly attached thereto, and means for supporting the bed in an open position including bed braces, each comprising hinged links pivotally attached to the camera body and to the camera bed and foldable about their hinge when the bed is in folded position, the combination with said braces, of a pin on a lower brace movable through a fixed path as the lower brace turns about its hinge connection with the camera bed, a lens board, an erecting link pivotally attached to the lens board, a pivotal mount on the camera bed carrying the erecting link, a cam on the erecting link lying in the path of movement of the pin and engaging said pin on the bed brace when the camera is erect, said cam on the erecting link lying between the pin on the bed brace and the pivotal support between the bed brace and bed, a cam on the lens board also lying in the path of movement of and engaging said pin when the camera is erect, said cam on the lens board lying between the pin on the bed brace and the pivotal connection between the bed brace and bed, both cams when the camera is in an erect position being frictionally engaged by the pin as they lie substantially in alignment whereby the lens board may be held in an erecting position and against movement toward the camera body until the pin moves from its position for supporting the bed in an open position.

2. In a self erecting front camera of the type including a camera body, a bed hingedly attached thereto for movement between an open and a closed position, jointed bed braces each comprising a pair of hinged links, each of said pair of hinged links being formed by an upper link pivoted to the camera body and a lower link pivoted to the camera bed, the combination with said bed braces, of a lens board, erecting links pivoted to the lens board and to the camera bed, guiding cams carried by the erecting links, pins carried by the lower links and engageable with said cams for guiding the erecting links through a predetermined path when the bed is moved on its hinge, a cam latching shoulder on said erecting links adapted to be engaged by said pins when said bed is in an open position, a second cam shoulder on the lens board also adapted to be engaged by said pins when the lens board is open, and means carried by said erecting links and spaced from the cam latching shoulders on the erecting links for engaging the lens board and tending to press the lens board forwardly when the bed is in an open position.

3. A self erecting front camera as defined in claim 2 characterized by the shoulders on the erecting links extending substantially circumferentially of the pivot of the lower link pivoted to the camera bed.

4. A self-erecting front camera as defined in claim 2 characterized by the second cam on the lens board and the said cam latching shoulder on the erecting links all extending substantially circumferentially of the pivots of the lower links on the camera bed.

5. A self-erecting front camera as defined in claim 2 characterized by the pivotal supports for the lower links including brackets on the bed with lugs formed over at points spaced from the pivots for engaging and limiting the possible movement of the erecting links when the bed is open.

DOUGLASS C. HARVEY.

REFERENCES CITED

The following references are of record in the file of this patent:

UNITED STATES PATENTS

| Number | Name | Date |
| --- | --- | --- |
| 1,380,810 | Kroedel | June 7, 1921 |
| 2,303,215 | Lessler | Nov. 24, 1942 |
| 2,325,346 | Thomas | July 27, 1943 |